US011559747B1

(12) United States Patent
Hirsch

(10) Patent No.: US 11,559,747 B1
(45) Date of Patent: Jan. 24, 2023

(54) SERVICE FOR SECURELY PLAYING VIDEO GAMES WITH PUBLICIZED PLAYERS

(71) Applicant: Amazon Technologies, Inc., Seattle, WA (US)

(72) Inventor: Sallie Hirsch, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/201,442

(22) Filed: Mar. 15, 2021

(51) Int. Cl.
*A63F 9/24* (2006.01)
*A63F 13/795* (2014.01)

(52) U.S. Cl.
CPC .................. *A63F 13/795* (2014.09)

(58) Field of Classification Search
CPC ....... A63F 13/795; A63F 13/49; A63F 13/497
USPC .......................................................... 463/29
See application file for complete search history.

(56) References Cited

U.S. PATENT DOCUMENTS

| | | | | |
|---|---|---|---|---|
| 2009/0113554 A1* | 4/2009 | Zalewski | ............. | G06F 21/552 726/26 |
| 2010/0069131 A1* | 3/2010 | Rochet | ..................... | G07C 1/22 463/7 |
| 2014/0058969 A1* | 2/2014 | Kane | ................. | G06Q 30/0279 705/329 |
| 2015/0231506 A1* | 8/2015 | Webb | ...................... | A63F 13/71 463/29 |
| 2015/0375102 A1* | 12/2015 | George | .................. | A63F 13/00 463/24 |
| 2019/0238952 A1* | 8/2019 | Boskovich | ........... | H04N 21/858 |

OTHER PUBLICATIONS

Fortnite, "Fortnite Celebrity Pro-Am | #FortniteProAm", https://www.youtube.com/watch?v=qPEIPu0V8GQ, Jun. 12, 2018 (Year: 2018).*
Lang, Derrik J., "Q&A: Will Arnett talks new Xbox show, celebrity gaming pals", https://www.poughkeepsiejournal.com/story/news/local/2015/02/11/will-arnett-celebrity-gaming/23228999/, Feb. 11, 2015 (Year: 2015).*
CBS News, "More than 100 celebrities join charity fundraising livestream to fight COVID-19", https://www.youtube.com/watch?v=Bji5IMpfunY, Apr. 18, 2020 (Year: 2020).*

(Continued)

*Primary Examiner* — Michael A Cuff
(74) *Attorney, Agent, or Firm* — BakerHostetler

(57) ABSTRACT

One or more interfaces may be provided that indicate a plurality of times at which a plurality of publicized players are scheduled to play in a plurality of video games for which a plurality of player slots are acquired based on satisfaction of at least one acquisition criterion. Player access to the plurality of video games may be limited to the publicized players and a plurality of users that acquire the plurality of player slots. A request may be received, via the one or more interfaces, for a first user to acquire a first player slot for playing in a first video game with a first publicized player. It may be verified that the at least one acquisition criterion has been satisfied in relation to the first user. Game access information may be provided, to the first user, that allows the first user to enter the first video game.

17 Claims, 8 Drawing Sheets

(56) References Cited

OTHER PUBLICATIONS

Dan Primack; "Celebrity video startup Cameo finalizing $300 million valuation"; https://www.axios.com/cameo-series-b-300-minion-valuation-a3e8440c-685f-4d2e-a458-41c24789f7bf.html; Axios; May 2019; accessed Apr. 1, 2021; 7 pages.

Kate Clark; "Cameo raises $50M to deliver personalized messages from celebrities & influencers"; https://techcrunch.com/2019/06/25/cameo/?renderMode=ie11; TechCrunch; Jun. 2019; accessed Apr. 1, 2021; 9 pages.

\* cited by examiner

610 Provide one or more interfaces indicating a plurality of times at which a plurality of publicized players are scheduled to play in a plurality of video games for which a plurality of player slots are acquired by a plurality of users based on satisfaction of at least one acquisition criterion

612 Receive, via the one or more interfaces, a request for a first user of the plurality of users to acquire a first player slot of the plurality of player slots for playing in a first video game of the plurality of video games with a first publicized player of the plurality of publicized players

614 Verify that at least one acquisition criterion (optionally including one or more behavior standards) has been satisfied in relation to the first user

616 Provide, to the first publicized player, publicized player game access information that allows the first publicized player to enter the first video game

618 Provide, to the first user, user game access information that allows the first user to enter the first video game

620 Configure video streaming of at least part of the first video game over one or more video streaming platforms via the service's video feed, the publicized player's video feed and/or the first user's video feed

622 Monitor, while the first user plays in the first video game, activity of the first user

624 Does the first user violate behavior standards? — YES

NO

626 Is the first user's allotted time window expired?

NO — YES

628 Disconnect first player from the first video game

FIG. 6

SERVICE FOR SECURELY PLAYING VIDEO GAMES WITH PUBLICIZED PLAYERS

BACKGROUND

Over the past few years, playing of video games has become an increasingly social experience. Some video game players may be fans of well-known game players, such as famous celebrities, influencers, streamers and the like. These fans may covet opportunities to play in a game with the well-known players. Moreover, the well-known players may often enjoy playing in video games with fans, for example because it may provide a fun and authentic way to build, and connect with, their fan bases. In some examples, a well-known player can make arrangements to play with fans, such as by posting a message including information about a game server and/or other game-related details. However, these games may be rare and not many slots may be available, so fans may have limited opportunities and may be unable to plan to play in advance. Moreover, sharing of game-related details may result in a number of problems. For example, in some cases, well-known players may share their player identifiers (e.g., gamertags), thereby exposing personal information and potentially allowing themselves to be tracked or followed in future games. Additionally, the well-known players may have limited, if any, control over which players join the games and how those players behave while participating in the games. For example, a well-known player could potentially be exposed to trolls and negative fan interactions.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 6 is a flowchart illustrating an example video game interaction process that may be used in accordance with the present disclosure.

DETAILED DESCRIPTION

Figure 1:
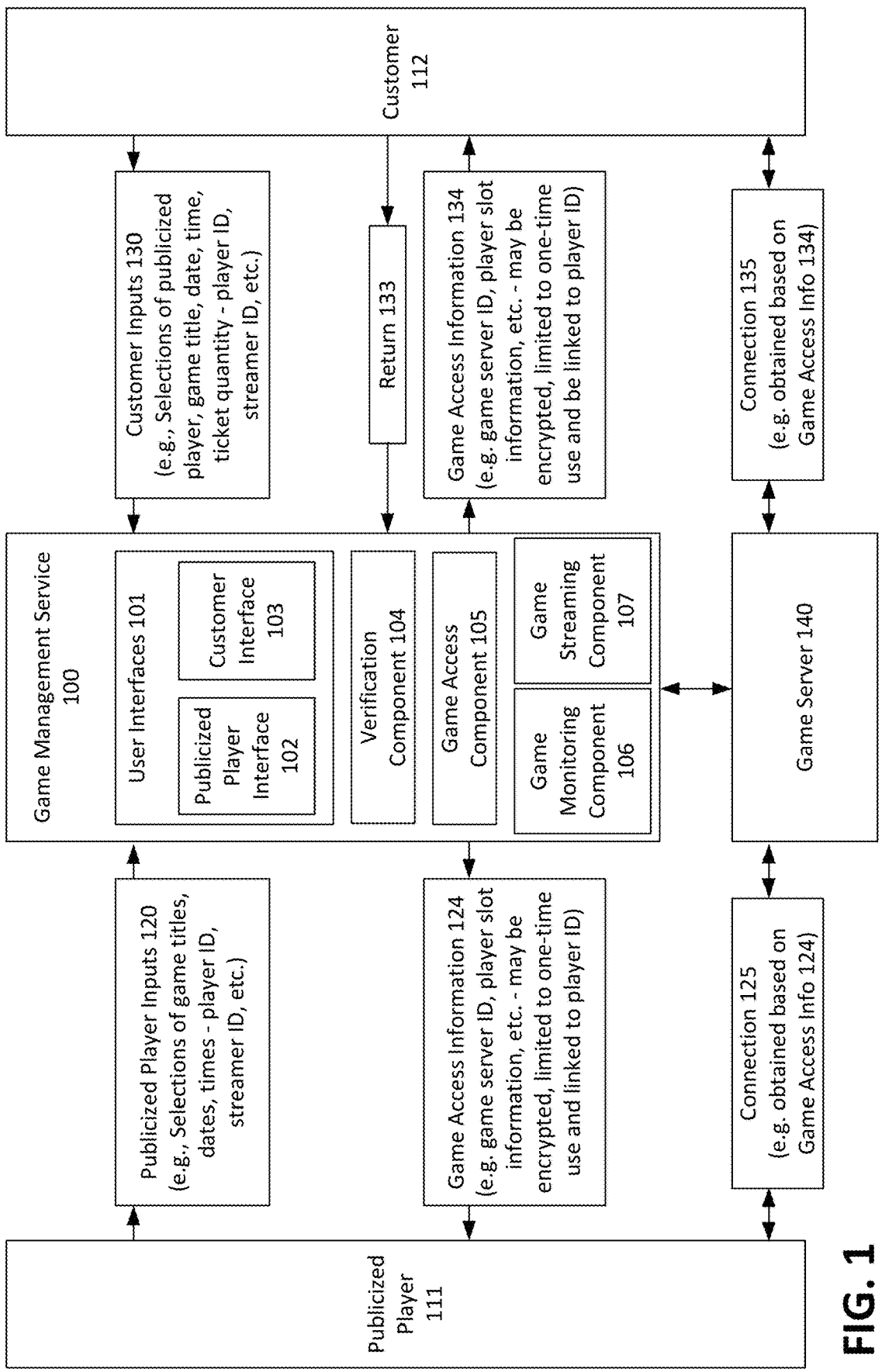
FIG. 1 is a diagram illustrating an example video game interaction system that may be used in accordance with the present disclosure.

Techniques for securely playing video games with publicized players are described herein. The term publicized player, as used herein, refers to a video game player whose scheduled participation in a video game is publicized, such as by being posted or otherwise indicated in one or more user interfaces. Some examples of publicized players may include certain famous celebrities, influencers, streamers and other well-known players. For example, some video game players may be fans of well-known game players. These fans may covet opportunities to play in a game with the well-known players. Moreover, the well-known players may often enjoy playing in video games with fans, for example because it may provide a fun and authentic way to build, and connect with, their fan bases.

As described herein, a service may be provided that allows fans and other users to securely play along with publicized players, such as certain famous celebrities, influencers, streamers and the like. Generally, the service may allow publicized players to schedule and publicize upcoming games in which they plan to play. The service may also allow fans and other users to search and view a publicized player's upcoming scheduled games, and to acquire access to a game to play along with the publicized player. As will be described in detail below, the service may allow game participation to be scheduled in advance without publicly exposing certain personal information, such as the publicized player's gamertag. The service may also allow users that attempt to acquire access to the games to be screened in advance, thereby helping to prevent trolls and other malicious users from interacting with the publicized players. Moreover, the service may also monitor the user's behavior during gameplay to detect and respond to negative interactions, such as by ejecting an offending user from gameplay.

In some examples, the service may provide a number of user interfaces that assist in allowing this gameplay in a secure manner. For example, the service may provide a publicized player interface that allows publicized players to interact with the service. In some examples, the publicized player interface may allow the publicized player to create a publicized player account for the service or to transfer and use an existing account from another service, such as a video streaming platform, online marketplace, etc. In some examples, upon creating and/or transferring the account, the publicized player may be asked to provide identity verification information to verify his or her purported identity and protect against imposters. The publicized player's account may be associated with respective account information, such as a name, contact information (e.g., email, phone number, etc.) and optionally a player identifier (e.g., gamertag), a streamer identifier (e.g., streamer key), and the like.

The publicized player interface may allow the publicized players to schedule upcoming video games in which they plan to play. For example, the publicized player interface may provide a browsable listing of supported game titles, from which a publicized player may select one or more game titles for which the publicized player would like to schedule one or more games. The publicized player interface may provide indications of available dates and times, from which a publicized player may select one or more dates and times at which to schedule one or more games. The publicized player interface may also provide additional information, such as a quantity of tickets that the publicized player wishes to be made available for each game, information about fees or compensation, and information regarding whether (and via which streaming platforms) the publicized player would like video of the game to be streamed by the service, such as via the service's streaming channel, via the publicized player's personal streaming channel, and/or via other feeds.

The service may also provide a customer interface that allows customers, such as fans of the publicized players, to interact with the service. In some examples, the customer interface may allow the customer to create a customer account for the service or to transfer and use an existing account from another service, such as a video streaming platform, online marketplace, etc. The customer's account may be associated with respective account information, such as a name, contact information (e.g., email, phone number, etc.) and optionally a player identifier (e.g., gamertag), a streamer identifier (e.g., streamer key), and the like.

The customer interface may allow a customer to view upcoming video games in which a publicized player is scheduled to participate. The customer interface may also allow the customer to acquire tickets to play along with the publicized player in one or more of those video games. For example, the customer interface may provide a browsable listing of publicized players for which video games have been scheduled. A customer may then select one of the publicized players from the listing in order to view dates and times of upcoming video games in which a publicized player is scheduled to participate. In some examples, the customer may then select one of the video games at a desired date and time. This may allow the customer to acquire tickets for the selected video game. In some examples, the customer may select a quantity of tickets to acquire and provide details about users that are associated with each ticket. For example, for each ticket, the customer may provide a respective name, contact information (e.g., email, phone number, etc.) and optionally a player identifier (e.g., gamertag), a streamer identifier (e.g., streamer key), and other information for the respective user for which the ticket is being purchased. In some examples, if a customer is purchasing a ticket for himself or herself, details about the customer may be pre-populated into the interface based on the customer's account information.

In some examples, a given video game may be divided into multiple time windows for which tickets may be individually acquired. As a specific example, a video game may be scheduled to start at 10:00 and may be scheduled to a have a one hour duration. In some cases, the video game could be divided into two half-hour time windows, such as from 10:00-10:30 and from 10:30-11:00. The service may then allow tickets to be individually acquired to play in either of these half-hour time slots, and the service could also offer other tickets to play in the entire game (i.e., in both time windows).

In some examples, customers may acquire tickets, via the service, based on satisfaction of at least one acquisition criterion. In some cases, the at least one acquisition criterion may include providing a return, such as a monetary and/or non-monetary fee. The term return, as used herein, refers to any monetary and/or non-monetary item that is provided in exchange for a ticket and/or player slot. For example, in some cases, to acquire a ticket, a customer may be required to pay a monetary fee or to provide a non-monetary fee such as credits. In some examples, the required amount of the fee or other return may be based on a membership level and/or other criteria. In yet other examples, there may be no required fee, or no other required return, if the customer has obtained a given membership level. In some cases, before issuing game access information to the customer, the service may verify that the customer has satisfied the at least one acquisition criterion, such as by verifying that the customer has provided any required payments, credits or other returns and/or verifying that the customer has a given membership level.

Additionally, in some examples, the at least one acquisition criterion may include confirming that the customer satisfies one or more behavior standards. For example, as described above, the service may be provided with information about the customer, such as the customer's name, contact information (e.g., email, phone number, etc.), player identifier (e.g., gamertag), streamer identifier (e.g., streamer key), and the like. The service may then use this information to confirm that the customer has not engaged in malicious behavior or other behavior that the publicized player may consider to be objectionable. For example, the service may confirm that the customer has not previously posted negative comments about the publicized player or other offensive or indecent comments or content. In some cases, before issuing game access information to the customer, the service may also verify that the customer has satisfied these and other behavior standards.

In some examples, at some point after verifying that the at least one acquisition criterion has been satisfied, the service may provide, to the customer, game access information that allows the customer to access the video game. Additionally, the service may provide, to the publicized player, game access information that allows the publicized player to access the video game. In some examples, the game access information may include information such as an identifier of a game server on which the game will be played, an identifier of a given player slot that is reserved for the publicized player or the customer, and the like. Furthermore, in some examples, the publicized player may choose to enter a given game server, and the details of the selected server may then be provided to the customers via the game access information. Additionally, in some examples, the game access information may be encrypted such that underlying details of the game information (e.g., game server identifier, etc.) are not revealed to the publicized players and/or the customers. This may help to prevent the underlying details of the game information from being obtained by hackers and may also prevent customers from voluntarily transferring the underlying details of the game information to other users. Furthermore, in some examples, the game access information may be configured to permit one-time-only access to the video game, such that the same game access information may not be employed to enter the game multiple times and/or by multiple players. Moreover, in some examples, the game access information may be linked to a player identifier (e.g., gamertag) of the publicized player or an individual customer, such that only the publicized player or the individual customer may use the game access information to access the video game.

In some examples, the service may control access to the game server, such as by acquiring administrative privileges on the game server, by otherwise coordinating with a gaming platform that operates the game server, or by operating the game server directly. Once gameplay has started, the service may monitor gameplay, such as by monitoring actions of the customers to ensure that the customers do not violate any behavior standards. For example, the service may monitor chat messages and video streams associated with the game, such as to confirm that customers do not make any comments that are obscene or offensive to the publicized player or other individuals. The service may also monitor in-game actions of the customers, such as to ensure that players do not engage in inappropriate and/or hostile behavior, such as repeatedly targeting and/or injuring the publicized player's in-game character, in-game inventory, etc. In some examples, if a customer violates these or other behavior standards, the service may eject the customer from the game or otherwise penalize the customer.

In some examples, the service may acquire one or more video streaming channel feeds, such as over which to transmit video (optionally including audio) of games that are scheduled and operated by the service. In some examples, the service's one or more video streaming channel feeds may be transmitted via one or more video streaming platforms. In some examples, for server-rendered gaming, the service may receive rendered audio and video of a game from the game server and may then provide the rendered audio and video to the one or more streaming platforms. In other examples, the service may receive game state data from the game server, and the service may use the game state data to render audio and video of the game. The service may then provide the rendered audio and video to the one or more streaming platforms.

Additionally, in some examples, the service may provide an automated streaming feature that allows video (optionally including audio) of a game to be broadcast over a player's own personal video streaming channel feed using the player's streamer identifier (e.g., streamer key). For example, both publicized players and customers may optionally provide their streamer identifiers to the service, such as via user interfaces of the service as described above. Using the automated streaming feature, the service may use a streamer identifier to provide video to streaming platforms and cause the video to be streamed on the player's personal streaming channel, in some cases without requiring any additional action on to be performed by the player (other than merely providing his or her streamer identifier to the service). In some examples, the player may optionally provide webcam video and audio of himself or herself, to the service, for transmission via the automated streaming feature. In some examples, the service may cause any, or all, of the video streams described above, including streams transmitted over the service's channels and personal channels of the players, to be transmitted using live streaming techniques. The term live streaming, as used herein, refer to scenarios in which video content of an event (e.g., video game) may be transmitted to viewers, and at least part of the video content may be played while the event is still occurring (e.g., while the video game is still being played by the players), albeit with some small amounts latency between the time that video content is captured and the time that the video is eventually played to viewers.

FIG. 1 is a diagram illustrating an example video game interaction system that may be used in accordance with the present disclosure. Game management service 100 may allow fans and other users to securely play along with publicized players, such as certain famous celebrities, influencers, streamers and the like. Game management service 100 provides user interfaces 101, including publicized player interface 102 and customer interface 103, that assist in allowing this gameplay in a secure manner. Publicized player interface 102 allows publicized players, such as publicized player 111, to interact with the game management service 100. In some examples, the publicized player interface 102 may allow the publicized player 111 to create a publicized player account for the game management service 100 or to transfer and use an existing account from another service, such as a video streaming platform, online marketplace, etc. In some examples, upon creating and/or transferring the account, the publicized player 111 may be asked to provide identity verification information to verify his or her purported identity and protect against imposters. The publicized player's account may be associated with respective account information, such as a name, contact information (e.g., email, phone number, etc.) and optionally a player identifier (e.g., gamertag), a streamer identifier (e.g., streamer key), and the like.

As shown in FIG. 1, publicized player inputs 120 may be received via the publicized player interface 102. The publicized player inputs 120 may include, for example, selections of game titles for which the publicized player 111 would like to schedule one or more games. The publicized player inputs 120 may also include selections of dates and times, at which the publicized player 111 would like to play. The publicized player inputs 120 may also include an indication of a player identifier (ID) (e.g., gamertag) and a streamer identifier (ID) (e.g., streamer key) of the publicized player 111. A player identifier, as that term is used herein, is an identifier that identifies a video game player on a gaming platform and/or on one or more video games. The player ID may be provided to assist in enabling the publicized player 111 to access one or more video games, as will be described in detail below. A streamer identifier, as that term is used herein, is an identifier that identifies a streamer that has an associated video streaming channel on a video streaming platform. The streamer ID may be provided to assist in allowing automated streaming on a personal streaming channel of the publicized player 111. The streamer identifier is an example of authorization information that allows control of contents of a video feed of the streamer on the video streaming platform.

Figure 2:
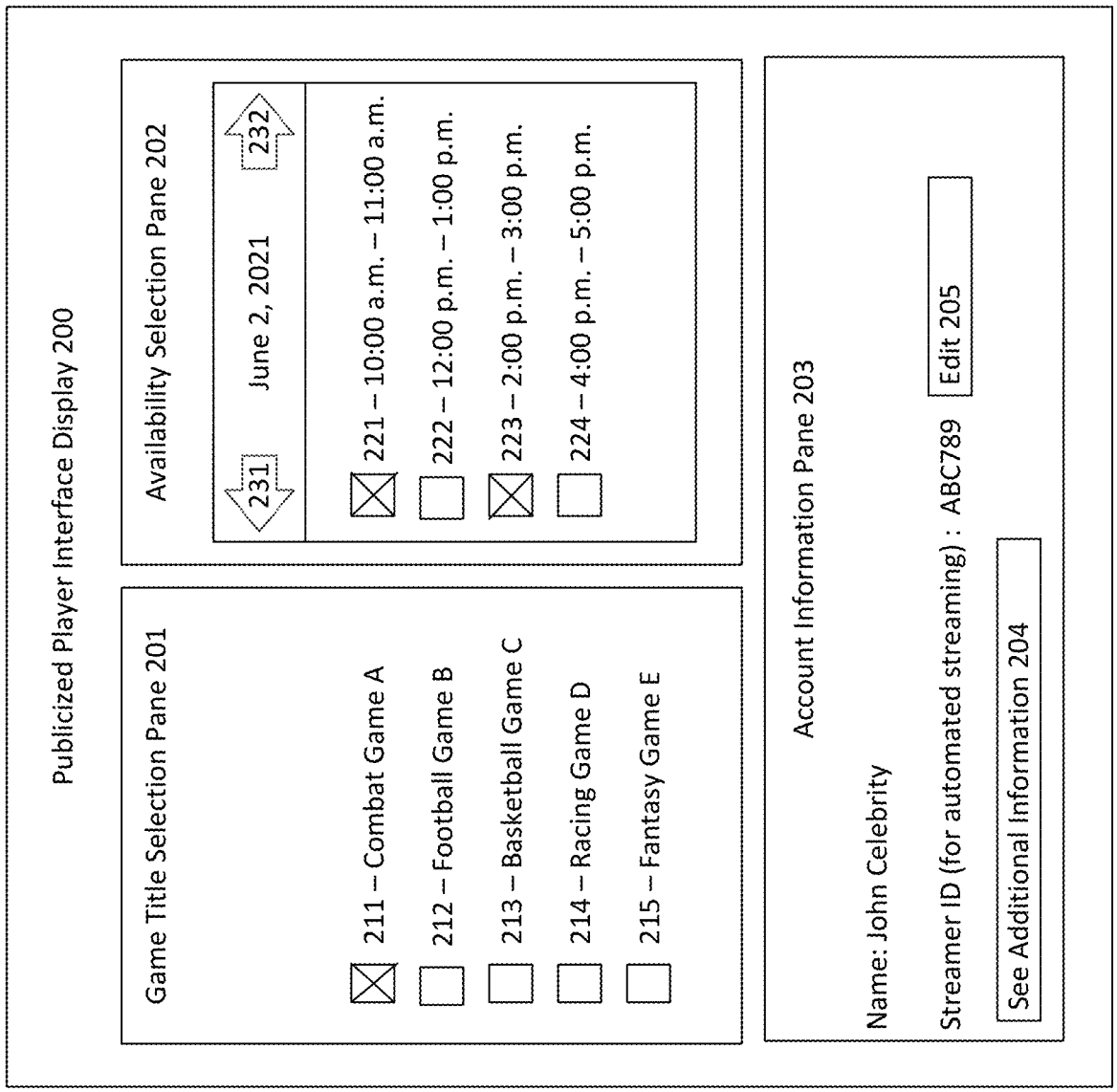
FIG. 2 is a diagram illustrating an example publicized player interface display that may be used in accordance with the present disclosure.

The publicized player interface 102 may allow the publicized player 111 to schedule upcoming video games in which he or she plans to play. Referring now to FIG. 2, an example of a publicized player interface display 200 of publicized player interface 102 will now be described in detail. The publicized player interface display 200 includes a game title selection pane 201, which includes a listing of supported game titles. In the example of FIG. 2, the supported game titles include Combat Game A, Football Game B, Basketball Game C, Racing Game E, and Fantasy Game E. The game title selection pane 201 includes checkboxes 211-215, which each allows selection of a respective game title. As shown in FIG. 2, the publicized player 111 has activated checkbox 211, which results in a selection of Combat Game A. This causes available dates and times for Combat Game A to be displayed in availability selection pane 202. The availability selection pane 202 provides indications of available dates and times for a game title that is selected via game title selection pane 201. The availability selection pane 202 allows the publicized player 111 to select different dates via backward arrow 231 (which allows scrolling to back to previous dates) and forward arrow 232 (which allows scrolling forward to subsequent dates). The availability selection pane 202 shows available game times for the currently selected date, which is Jun. 2, 2021. In this example, there are four available times on Jun. 2, 2021. Checkboxes 221-224 allow selection of each of the four respective available times. As shown in FIG. 2, the publicized player 111 has selected checkbox 221 to indicate that he or she will play in the game starting at 10:00 ante meridiem (a.m.). The publicized player 111 has also selected checkbox 223 to indicate that he or she will play in the game starting at 2:00 post meridiem (p.m.).

The publicized player interface display 200 also includes an account information pane 203, which shows information about the account of publicized player 111. In this example, the account information pane 203 shows the name and streamer ID of publicized player 111. The See Additional Information button 204 may allow additional information to be shown, such as the player ID and contact information of the publicized player 111. The Edit button 205 may allow account information to be edited. The publicized player interface 102 may optionally allow additional information to be provided, such as a quantity of tickets that the publicized player wishes to be made available for each game, information about fees or compensation, and information regarding whether (and via which streaming platforms) the publicized player would like video of the game to be streamed by the service, such as via the service's streaming channel, via the publicized player's personal streaming channel, and/or via other feeds.

The customer interface 103 may allow customers, such as fans of the publicized players, to interact with the game management service 100. In some examples, the customer interface 103 may allow customers, such as customer 112, to create a customer account for the service or to transfer and use an existing account from another service, such as a video streaming platform, online marketplace, etc. The customer's account may be associated with respective account information, such as a name, contact information (e.g., email, phone number, etc.) and optionally a player identifier (e.g., gamertag), a streamer identifier (e.g., streamer key), and the like. Referring back to FIG. 1, it is shown that customer inputs 130 may be received via the customer interface 103. The customer inputs 130 may include, for example, selections of a publicized player with which the customer 112 would like to play. The customer inputs 130 may also include selections of game titles that the customer 112 would like to play and selection of dates and times at which the customer 112 would like to play. The customer inputs 130 may also include an indication of a player identifier (ID) (e.g., gamertag) and a streamer identifier (ID) (e.g., streamer key) of the customer 112. The player ID may be provided to assist in enabling the customer 112 to access a selected video game, as will be described in detail below. The streamer ID may be provided to assist in allowing automated streaming on a personal streaming channel of the customer 112.

Figure 3:
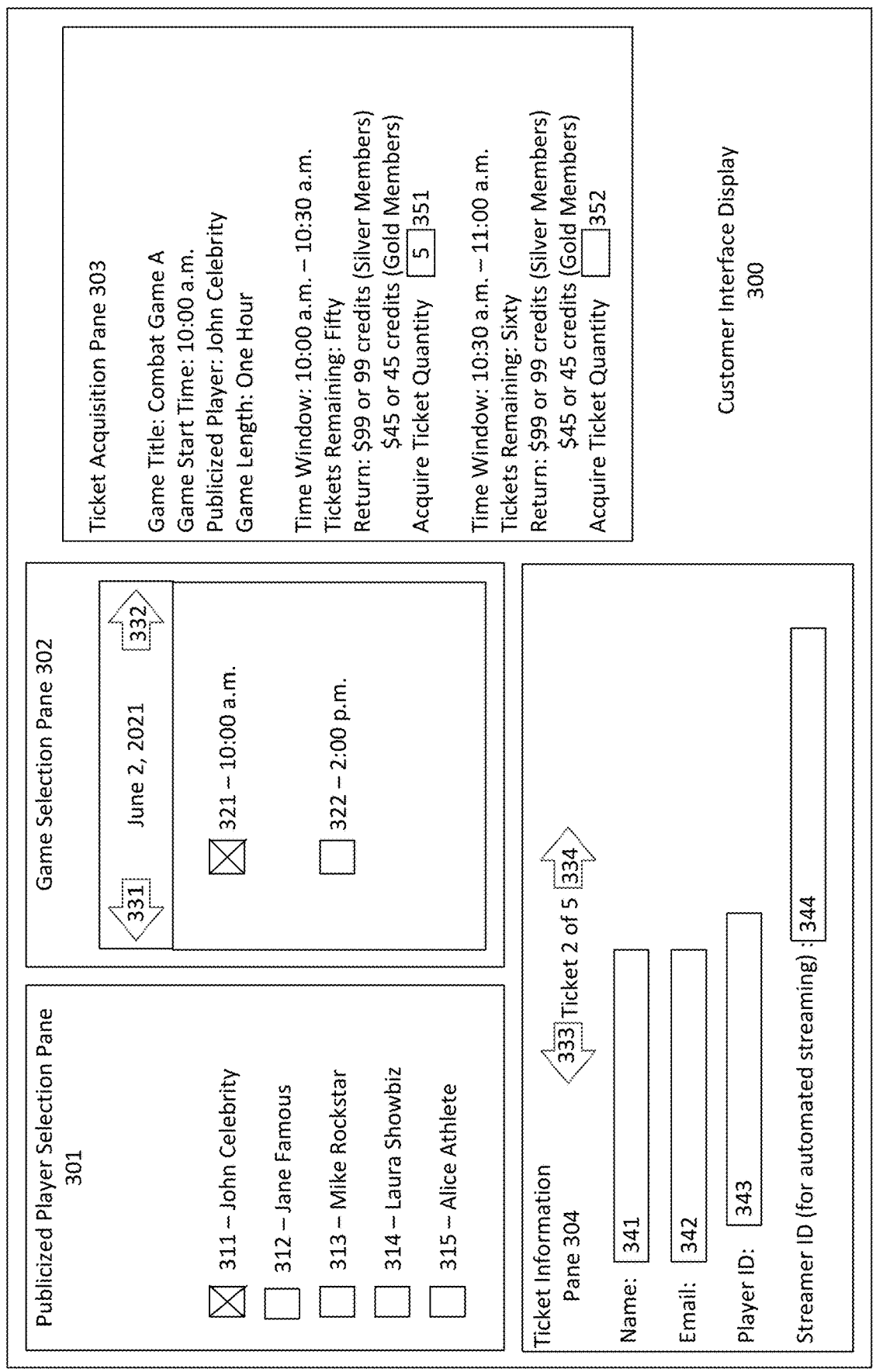
FIG. 3 is a diagram illustrating an example customer interface display that may be used in accordance with the present disclosure.

The customer interface 103 may allow a customer 112 to view upcoming video games in which a publicized player is scheduled to participate. The customer interface 103 may also allow the customer 112 to acquire tickets to play along with the publicized player in one or more of those video games. Referring now to FIG. 3, an example of a customer interface display 300 of customer interface 103 will now be described in detail. In this example, customer interface display 300 includes a publicized player selection pane 301 that includes a listing of publicized players for which video games have been scheduled. The publicized player selection pane 301 includes checkboxes 311-315, which allow the customer 112 to select respective publicized players. In this example, the customer 112 has activated checkbox 311 in order to select John Celebrity. The activation of checkbox 311 may cause available dates and times to be shown, in game selection pane 302, for games in which John Celebrity is scheduled to play. The game selection pane 302 allows the customer 112 to select different dates via backward arrow 331 (which allows scrolling to back to previous dates) and forward arrow 332 (which allows scrolling forward to subsequent dates). The game selection pane 302 shows available game times for John Celebrity for the currently selected date, which is Jun. 2, 2021. In this example, there are two available times on Jun. 2, 2021. Checkboxes 321-322 allow selection of each of the two respective available times. As shown in FIG. 2, the customer 112 has activated checkbox 321 in order to select the game starting at 10:00 a.m. This may allow the customer 112 to acquire tickets for the selected video game.

In this example, activation of checkbox 321 causes information associated with the game starting at 10:00 a.m. to be displayed in ticket acquisition pane 303. Specifically, ticket acquisition pane 303 displays details about the selected game, such as the game title (Combat Game A), game start time (10:00 a.m.), game duration (one hour), and the publicized player (John Celebrity) that is participating in the game. The ticket acquisition pane 303 also displays information regarding two time windows for which tickets may be purchased including a first time window (10:00 a.m.-10:30 a.m.) and a second time window (10:30 a.m.-11:00 a.m.). Specifically, ticket acquisition pane 303 shows a respective quantity of remaining tickets for each time window and a respective return that is required to acquire tickets for each time window. In this example, the required return to acquire tickets for either time window is $99 dollars or 99 credits for silver members and $45 dollars or 45 credits for gold members. Input field 351 allows the customer 112 to select a number of tickets to acquire for the first time window, while input field 351 allows the customer 112 to select a number of tickets to acquire for the second time window. In this example, the number five is entered the into input field 351 to indicate the customer 112 wishes to acquire five tickets for the first time window.

In the example of FIG. 3, entering of the number five in user input field 351 causes ticket information pane 304 to allow entering of ticket information for five tickets for the first time window (10:00 a.m.-10:30 a.m.) of the game starting at 10:00 a.m. with John Celebrity. The ticket information pane 304 allows the customer 112 to select different tickets via backward arrow 333 (which allows scrolling to back to previous tickets) and forward arrow 334 (which allows scrolling forward to subsequent tickets). In this example, ticket two (of five) is the currently selected ticket, which means that the user is currently entering information for ticket two. The ticket information pane 304 includes input fields 341-344, which allow the customer 112 to enter information for the selected ticket. Specifically, input field 341 allows entry of a customer name for the ticket, input field 342 allows entry of a customer email for the ticket, input field 343 allows entry of a player ID for the ticket, and input field 344 allows entry of a streamer ID for the ticket.

In some examples, customers may acquire tickets, via the service, based on satisfaction of at least one acquisition criterion. In some cases, the at least one acquisition criterion may include providing a return, such as a monetary and/or non-monetary fee. Referring back to FIG. 1, it is shown that return 133 is provided from customer 112 to the game management service 100. For example, in some cases, to acquire a ticket, customer 112 may be required to pay a monetary fee or to provide a non-monetary fee such as credits. In some examples, the required amount of the fee or other return 133 may be based on a membership level and/or other criteria. In the example of FIG. 3, the required return to acquire tickets for either the first or the second time window is $99 dollars or 99 credits for silver members and $45 dollars or 45 credits for gold members. In yet other examples, there may be no required fee, or no other required return, if the customer 112 has obtained a given membership level. The game management service 100 includes a verification component 104, which verifies that the customer 112 has satisfied the at least one acquisition criterion, such as by verifying that the customer 112 has provided any required payments, credits or other returns and/or verifying that the customer 112 has a given membership level. The game management service 100 may verify that the at least one acquisition criterion is satisfied before providing game access information 134 to customer 112.

Additionally, in some examples, the at least one acquisition criterion may include confirming that the customer 112 satisfies one or more behavior standards. For example, as described above, the game management service 100 may be provided with information about the customer 112, such as the customer's name, contact information (e.g., email, phone number, etc.), player identifier (e.g., gamertag), streamer identifier (e.g., streamer key), and the like. The verification component 104 may then use this information to confirm that the customer 112 has not engaged in malicious behavior or other behavior that the publicized player may consider to be objectionable. For example, the verification component 104 may confirm that the customer 112 has not previously posted negative comments about the publicized player 111 or other offensive or indecent comments or content. In some cases, before game access information 134 is issued to the customer 112, the verification component 104 may also verify that the customer 112 has satisfied these and other behavior standards.

In some examples, each of the tickets acquired via the customer interface 103 may be for a respective player slot. In some examples, a player slot represents an available player connection to a video game and/or game server. A player slot may be acquired for an entire duration of a game or for only a selected time window (e.g., the time window or second time window described above). In some examples, the game management service may maintain stored records of player slots for each game as well as indications of whether each player slot has already been acquired by a customer or is still available for acquisition. Acquiring a player slot, as that phrase is used herein, refers to obtaining the rights to use that player slot, such as by satisfying at least one acquisition criterion required to acquire the player slot. When a video game is being played, a customer may subsequently access and use his or her acquired player slot, such as by connecting to a game server that executes the video game using game access information as described below.

After it is verified that the at least one acquisition criterion has been satisfied, the game access component 105 may generate and provide, to the customer 112, game access information 134 that allows the customer 112 to access a video game for which the customer 112 has acquired a player slot, such as by acquiring a ticket for the player slot. As shown in FIG. 1, the customer 112 connects to game server 140 via connection 135. Additionally, the game access component 105 may also generate and provide, to the publicized player 111, game access information 124 that allows the publicized player 111 to access the video game. As shown in FIG. 1, the publicized player 111 connects to game server 140 via connection 125. In some examples, the game access information 124 and 134 may include information such as an identifier of a game server 140 on which the game is played, an identifier of a given player slot that is reserved for the publicized player 111 or the customer 112, and the like. Furthermore, in some examples, the publicized player 111 may choose to enter game server 140, and the details of game server 140 may then be provided to the customer 112 via the game access information 134. Additionally, in some examples, the game access information 124 and 134 may be encrypted such that underlying details of the game access information 124 and 134 (e.g., game server identifier, etc.) are not revealed to the publicized player 111 and/or the customer 112. This may help to prevent the underlying details of the game access information 124 and 134 from being obtained by hackers and may also prevent customers from voluntarily transferring the underlying details of the game access information 124 and 134 to other users. Furthermore, in some examples, the game access information 124 may be configured to permit one-time-only access to the video game, such that the game access information 124 may not be employed to enter the game multiple times and/or by multiple players. Similarly, the game access information 134 may be configured to permit one-time-only access to the video game, such that the game access information 134 may not be employed to enter the game multiple times and/or by multiple players. Moreover, in some examples, the game access information 124 may be linked to a player identifier (e.g., gamertag) of the publicized player 111, such that only the publicized player 111 may use the game access information 124 to access the video game. Similarly, in some examples, the game access information 134 may be linked to a player identifier (e.g., gamertag) of the customer 112, such that only the customer 112 (and no other customers) may use the game access information 134 to access the video game.

In one specific example, game access information 134 may include a first encrypted version of a game server identifier that may be sent to customer 112. The first encrypted version of the game server identifier may be used one time to allow the customer 112 to access the game server 140. After the customer 112 accesses the game server 140, the first encrypted version of the game server identifier may become unusable, such that other users cannot enter the game server even if they were to obtain and provide the first encrypted version of the game server identifier. Also, in some examples, the first encrypted version of the game server identifier (and/or other game access information) could be linked to the customer 112, such as to a player identifier (e.g., gamertag) of customer 112. This linkage would also prevent users other than customer 112 from using the first encrypted version of the game server identifier to gain access to the video game.

In some examples, such as when customer 112 has acquired a ticket for a time window that is less than the duration of the entire game, the game access information 124 may be configured to allow access for only the time window corresponding to the customer's ticket. For example, in some cases, the game access information 124 may be configured to be valid only during the time window (and/or within a specified time period prior to opening of the time window). In other examples, the game access component 105 may configure the player slot that is acquired by the customer 112 to open and/or expire at the start and/or end of the time window. In some examples, the game management service 100 may control access to the game server 140, such as by acquiring administrative privileges on the game server 140, by otherwise coordinating with a gaming platform that operates the game server 140, or by operating the game server 140 directly.

Once gameplay has started, the game monitoring component 106 of game management service 100 may monitor gameplay, such as by monitoring actions of the customers to ensure that the customers do not violate any behavior standards. For example, the game monitoring component 106 may monitor chat messages and video streams associated with the game, such as to confirm that customers do not make any comments that are obscene or offensive to the publicized player or other individuals. The game monitoring component 106 may also monitor in-game actions of the customers, such as to ensure that players do not engage in inappropriate and/or hostile behavior, such as repeatedly targeting and/or injuring the publicized player's in-game character, in-game inventory, etc. In some examples, if a customer violates these or other behavior standards, the game management service 100 may eject the customer from the game or otherwise penalize the customer.

Figure 4:
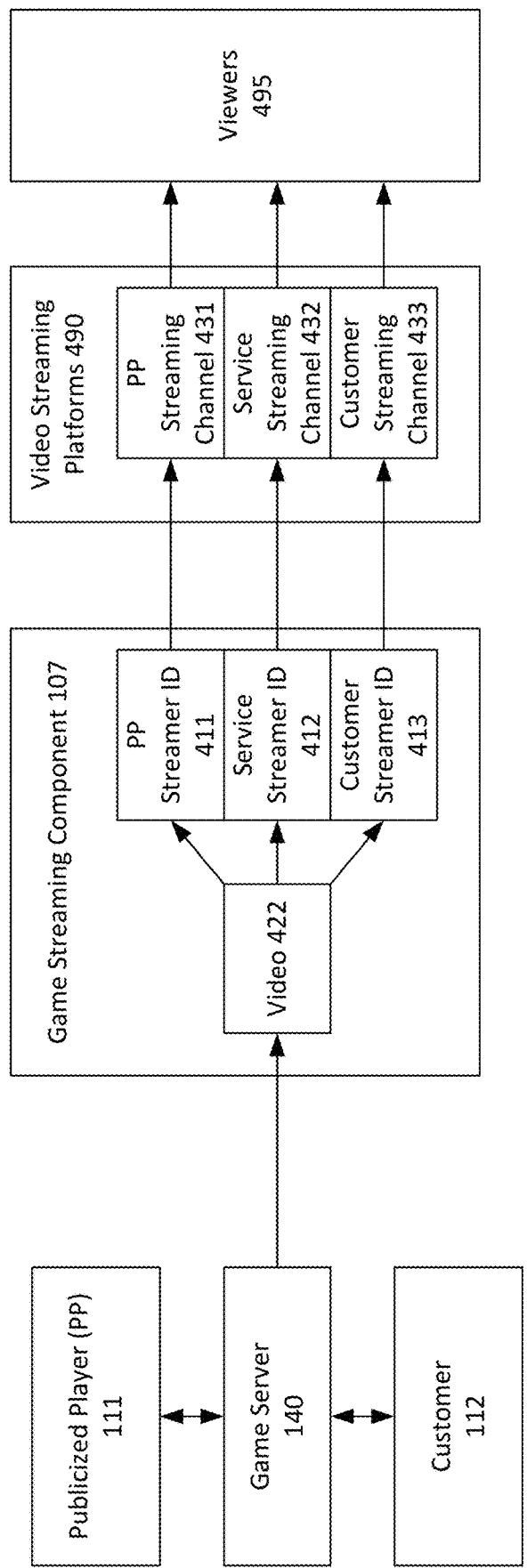
FIG. 4 is a diagram illustrating a first example video game streaming configuration that may be used in accordance with the present disclosure.

Referring now to FIG. 4, an example video streaming configuration will now be described in detail. In the example of FIG. 4, game streaming component 107 of game management service 100 obtains video 422 of a video game being played by publicized player 111 and customer 112 (and any number of other players) on game server 140. In some examples, for server-rendered gaming, the game streaming component 107 may receive rendered audio and video of the game from the game server 140, and this rendered audio and video may be included in video 422. In other examples, the game streaming component 107 may receive game state data from the game server 140, and the game streaming component 107 may use the game state data to render video 422 (which may optionally include corresponding audio). In the example of FIG. 4, the game management service 100 has its own video streaming channel, which is service streaming channel 432. As shown in FIG. 4, the game streaming component 107 may cause video 422 to be transmitted, over service streaming channel 432, to viewers 495, via one or more video streaming platform(s) 490. The game streaming component 107 may provide the service's streamer identifier (e.g., streamer key), which is service streamer ID 412, to the one or more video streaming platform(s) 490 in order to cause the video 422 to be transmitted over service streaming channel 432. The video 422 may be transmitted from game streaming component 107 to video streaming platform(s) 490, and in turn from video streaming platform(s) 490 to viewers 495, over one or more networks, for example one or more local area networks (LAN's) and/or one or more wide area networks (WAN's), such as the Internet. Additionally, the video 422 is transmitted using streaming transmission techniques, in which portions of transmitted content are received and played while subsequent portions of the transmitted content are being transmitted.

The game management service 100 may provide an automated streaming feature that allows video (optionally including audio) of the game to be broadcast over a player's own personal video streaming channel feed using the player's streamer identifier (e.g., streamer key). For example, as shown in FIG. 4, publicized player 111 has provided his or her personal streamer identifier (publicized player (PP) streamer ID 411) to the game streaming component 107, for example via publicized player interface 102 as described above. Using the automated streaming feature, the game streaming component 107 may use PP streamer ID 411 to cause the video 422 to be streamed on the publicized player's personal streaming channel (PP streaming channel 431), in some cases without requiring any additional action on to be performed by the publicized player 111 (other than merely providing the PP streamer ID 411 to the game streaming component 107). Additionally, customer 112 has provided his or her personal streamer identifier (customer streamer ID 413) to the game streaming component 107, for example via customer interface 103 as described above. Using the automated streaming feature, the game streaming component 107 may use customer streamer ID 413 to cause the video 422 to be streamed on the customer's personal streaming channel (customer streaming channel 433), in some cases without requiring any additional action on to be performed by the customer 112 (other than merely providing the customer streamer ID 413 to the game streaming component 107).

Figure 5:
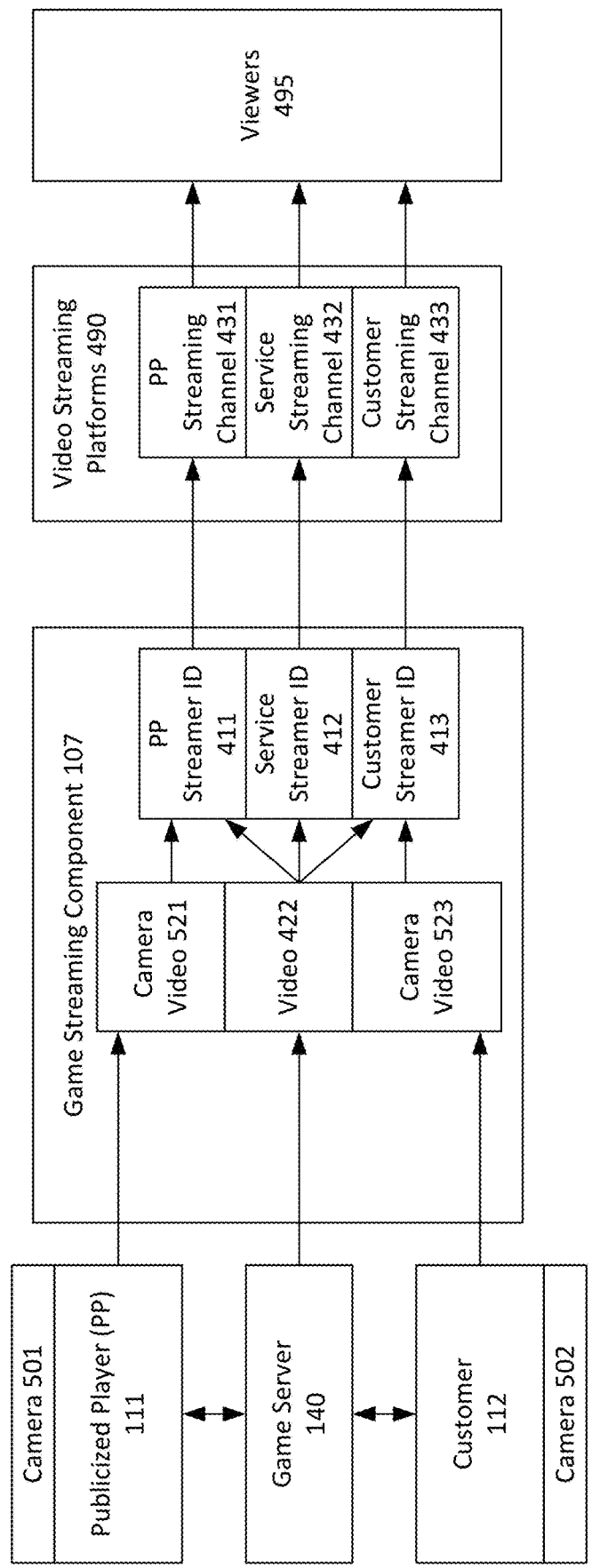
FIG. 5 is a diagram illustrating a second example video game streaming configuration that may be used in accordance with the present disclosure.

In some examples, a player may optionally provide webcam video of himself or herself, to the service, for transmission via the automated streaming feature. For example, referring now to FIG. 5, it is seen that publicized player 111 has a corresponding camera 501, such as a webcam, which captures camera video 521 (optionally including audio captured via a corresponding microphone) of the publicized player 111 as he or she plays the game. In the example of FIG. 5, publicized player 111 provides camera video 521 to the game streaming component 107. The game streaming component 107 may then combine the camera video 521 and the video 422, for example as a picture-in-picture video feed, for streaming on PP streaming channel 431 using PP streamer ID 411. Additionally, customer 112 has a corresponding camera 502, such as a webcam, which captures camera video 523 (optionally including audio captured via a corresponding microphone) of the customer 112 as he or she plays the game. In the example of FIG. 5, customer 112 provides camera video 523 to the game streaming component 107. The game streaming component 107 may then combine the camera video 523 and the video 422, for example as a picture-in-picture video feed, for streaming on customer streaming channel 433 using customer streamer ID 413. In some examples, the game streaming component 107 may cause any, or all, of the video streams described above, including streams transmitted over the service's channels and personal channels of the players, to be transmitted using live streaming techniques. The term live streaming, as used herein, refer to scenarios in which video content of an event (e.g., video game) may be transmitted to viewers 495, and at least part of the video content may be played while the event is still occurring (e.g., while the video game is still being played by the players), albeit with some small amounts latency between the time that video content is captured and the time that the video is eventually played to viewers 495.

FIG. 6 is a flowchart illustrating an example video game interaction process that may be used in accordance with the present disclosure. In some examples, any, or all, of the operations of FIG. 6 may be performed by game management service 100 of FIG. 1. The process of FIG. 6 is initiated at operation 610, at which one or more interfaces are provided that indicate a plurality of times at which a plurality of publicized players are scheduled to play in a plurality of video games for which a plurality of player slots are acquired based on satisfaction of at least one acquisition criterion. For example, as described above, a game management service may provide a customer interface that indicates a plurality of times at which a plurality of publicized players are scheduled to play in a plurality of video games for which a plurality of player slots are acquired based on satisfaction of at least one acquisition criterion. As shown in FIG. 3, the customer interface may allow users (e.g., customers) to select a given publicized player (e.g., John Celebrity) and to view dates and times for upcoming video games in which the publicized player plans to play. Player access to the plurality of video games may be limited to the plurality of publicized players and a plurality of users that acquire the plurality of player slots. The one or more first interfaces may be provided by a service (e.g., game management service 100 of FIG. 1) that allows the plurality of users to play with the plurality of publicized players without publicly exposing game player identifiers of the plurality of publicized players and identifiers of game servers on which the plurality of video games are played. In some examples, a first publicized player of the plurality of publicized players may be scheduled to play in a first video game of the plurality of video games at a first time of the plurality of times. For example, as shown in FIG. 3, John Celebrity is scheduled to play in a video game (e.g., Combat Game A) starting on Jun. 2, 2021 at 10:00 a.m. As also described above, the game management service may provide one or more second interfaces (e.g., publicized player interface 102) that allow the plurality of publicized players to schedule the plurality of times at which the plurality of publicized players are scheduled to play in the plurality of video games.

At operation 612, a request is received, via the one or more first interfaces, for a first user of the plurality of users to acquire a first player slot of the plurality of player slots for playing in a first video game of the plurality of video games with a first publicized player of the plurality of publicized players. For example, as shown in FIG. 3, a request is received via the customer interface for a user (e.g. customer) to acquire a first player slot for playing with John Celebrity in Combat Game A starting at 10:00 a.m. In some examples, the first player slot may allow the first user to play in only part of the first video game that corresponds to a selected time duration. For example, as shown in FIG. 3, the user requests five tickets for the 10:00 a.m.-10:30 a.m. time window. In the example of FIG. 3, the user requests five tickets, such as for the user and four other users to play in the game. The user makes this request by entering the number five in user input field 351, which indicates the user's desire to acquire five tickets. As also shown in FIG. 3, for each of the five tickets, the customer interface may allow the user to enter respective user information (e.g., name, email address, player ID, streamer ID) for each of the five tickets via ticket information pane 304.

At operation 614, it is verified that the at least one acquisition criterion has been satisfied in relation to the first user. For example, as described above, customers may acquire tickets, via the service, based on satisfaction of at least one acquisition criterion. In some cases, the at least one acquisition criterion may include providing a return, such as a monetary and/or non-monetary fee. For example, in some cases, to acquire a ticket, a customer may be required to pay a monetary fee or to provide a non-monetary fee such as credits. In some examples, the required amount of the fee or other return may be based on a membership level and/or other criteria. In the example of FIG. 3, a return of $99 dollars or 99 credits is required for each ticket for silver members, while a return of $45 dollars or 45 credits is required for each ticket for gold members. In some cases, before issuing game access information to the first user, the service may verify that the first user has satisfied the at least one acquisition criterion, such as by verifying that the first user has provided any required payments, credits or other returns and/or verifying that the customer has a given membership level. Additionally, in some examples, verifying that the at least one acquisition criterion has been satisfied in relation to the first user may include verifying that the first user satisfies one or more behavior standards included in the at least one acquisition criterion. For example, as described above, the service may be provided with information about the first user, such as the first user's name, contact information (e.g., email, phone number, etc.), player identifier (e.g., gamertag), streamer identifier (e.g., streamer key), and the like. The service may then use this information to confirm that the first user has not engaged in malicious behavior or other behavior that the publicized player may consider to be objectionable. For example, the service may confirm that the first user has not previously posted negative comments about the publicized player or other offensive or indecent comments or content. In some examples, the game management service may monitor various communications media, such as chat pages, and keep records of negative comments made about publicized players. The game management service may then search these records to confirm that the first user has not made negative comments about the first publicized player. As another example, the game management service may perform an Internet search or other electronic search to verify that the first user has not posted negative comments about the first publicized player. In some examples, if the searches (e.g., record search, Internet search, etc.) do not uncover any negative comments or posts about the first publicized player that have been made by the first user, then the this may serve as verification that the first user has satisfied the one or more behavior standards. By contrast, if the searches do uncover negative comments or posts about the first publicized player that have been made by the first user, then the this may violate the one or more behavior standards.

At operation 616, publicized player game access information that allows the first publicized player to enter the first video game is provided to the first publicized player. For example, as shown in FIG. 1, game access information 124 is provided by game management service 100 to publicized player 111. At operation 618, user player game access information that allows the first user to enter the first video game is provided to the first user. For example, as shown in FIG. 1, game access information 134 is provided by game management service 100 to customer 112. The user player game access information may be provided to the first user based at least in part on verifying that the at least one acquisition criterion has been satisfied in relation to the first user (e.g. at operation 614). As described above, in some examples, the game access information may include information such as an identifier of a game server on which the game will be played, an identifier of a given player slot that is reserved for the publicized player or the customer, and the like. Furthermore, in some examples, the publicized player may choose to enter a given game server, and the details of the selected server may then be provided to the customers via the game access information. Additionally, in some examples, the game access information may be encrypted such that underlying details of the game information (e.g., game server identifier, etc.) are not revealed to the publicized players and/or the customers. This may help to prevent the underlying details of the game information from being obtained by hackers and may also prevent customers from voluntarily transferring the underlying details of the game information to other users. Furthermore, in some examples, the game access information may be configured to permit one-time-only access to the video game, such that the same game access information may not be employed to enter the game multiple times and/or by multiple players. For example, the user game access information may be usable only a single time to enter the first video game. Additionally, the publicized player game access information may be usable only a single time to enter the first video game. Moreover, in some examples, the game access information may be linked to a player identifier (e.g., gamertag) of the publicized player or an individual customer, such that only the publicized player or the individual customer may use the game access information to access the video game.

At operation 620, video streaming of at least part of the first video game over one or more video streaming platforms is configured via the service's video feed, the publicized player's video feed and/or the first user's video feed. For example, as shown in FIG. 4, video 422, which is video of a game being played by publicized player 111 and customer 112, may be streamed over service streaming channel 432, PP stream channel 431 and customer streaming channel 433. The game management service may employ its own streaming authorization information (e.g., service streamer ID 412) to cause the video 422 to be streamed over its own streaming channel (e.g., service streaming channel 432). Additionally, the game management service (e.g., the service that provides the one or more interfaces described above) may receive, from the first user, authorization information that allows control of contents of a video feed of the first user on a video streaming platform. For example, as described above, the game management service may receive the first user's streamer ID (e.g., customer streamer ID 413) via the customer interface (e.g., via input field 344 of FIG. 3). The game management service may then configure, based at least in part on the authorization information, video streaming of at least part of the first video game via the video feed. For example, as shown in FIG. 4, the game management service may use customer streamer ID 413 to cause the video 422 to be streamed over the customer streaming channel 433, such as by providing the customer streamer ID 413 to a video streaming platform at the initiation of the transmission of video 422. Furthermore, the game management service may receive, from the first publicized player, authorization information that allows control of contents of a video feed of the first publicized player on a video streaming platform. For example, as described above, the game management service may receive the first publicized player's streamer ID (e.g., PP streamer ID 411) via the publicized player interface. The game management service may then configure, based at least in part on the authorization information, video streaming of at least part of the first video game via the video feed. For example, as shown in FIG. 4, the game management service may use PP streamer ID 411 to cause the video 422 to be streamed over the PP streaming channel 431, such as by providing the PP streamer ID 411 to the video streaming platform at the initiation of the transmission of video 422.

At operation 622, activity of the first user is monitored while the first user plays in the first video game. As described above, once gameplay has started, the service may monitor gameplay, such as by monitoring actions of the customers to ensure that the customers do not violate any behavior standards. For example, the service may monitor chat messages and video streams associated with the game, such as to confirm that customers do not make any comments that are obscene or offensive to the publicized player or other individuals. The service may also monitor in-game actions of the customers, such as to ensure that players do not engage in inappropriate and/or hostile behavior, such as repeatedly targeting and/or injuring the publicized player's in-game character, in-game inventory, etc. In some examples, if a customer violates these or other behavior standards, the service may eject the customer from the game or otherwise penalize the customer. At operation 624, it is determined whether the first user has violated any behavior standards. For example, in some cases, it may be determined, based on the monitoring, that the first user has violated one or more behavior standards. At operation 628, the first user may then be disconnected from the first video game based on violation of the one or more behavior standards. If no behavior standards are violated, the process may proceed to operation 626.

At operation 626, it is determined whether the first user's allotted time window has expired. For example, as shown in FIG. 3, the user acquires tickets for the 10:00 a.m.-10:30 a.m. time window. Thus, in the example of FIG. 3, the first user's time allotted time window expires at 10:30 a.m. If the first user's time allotted time window has expired, then, at operation 628, the first user may be disconnected from the first video game. By contrast, if the first user's time allotted time window has not expired, then the process may return to operation 622.

Figure 7:
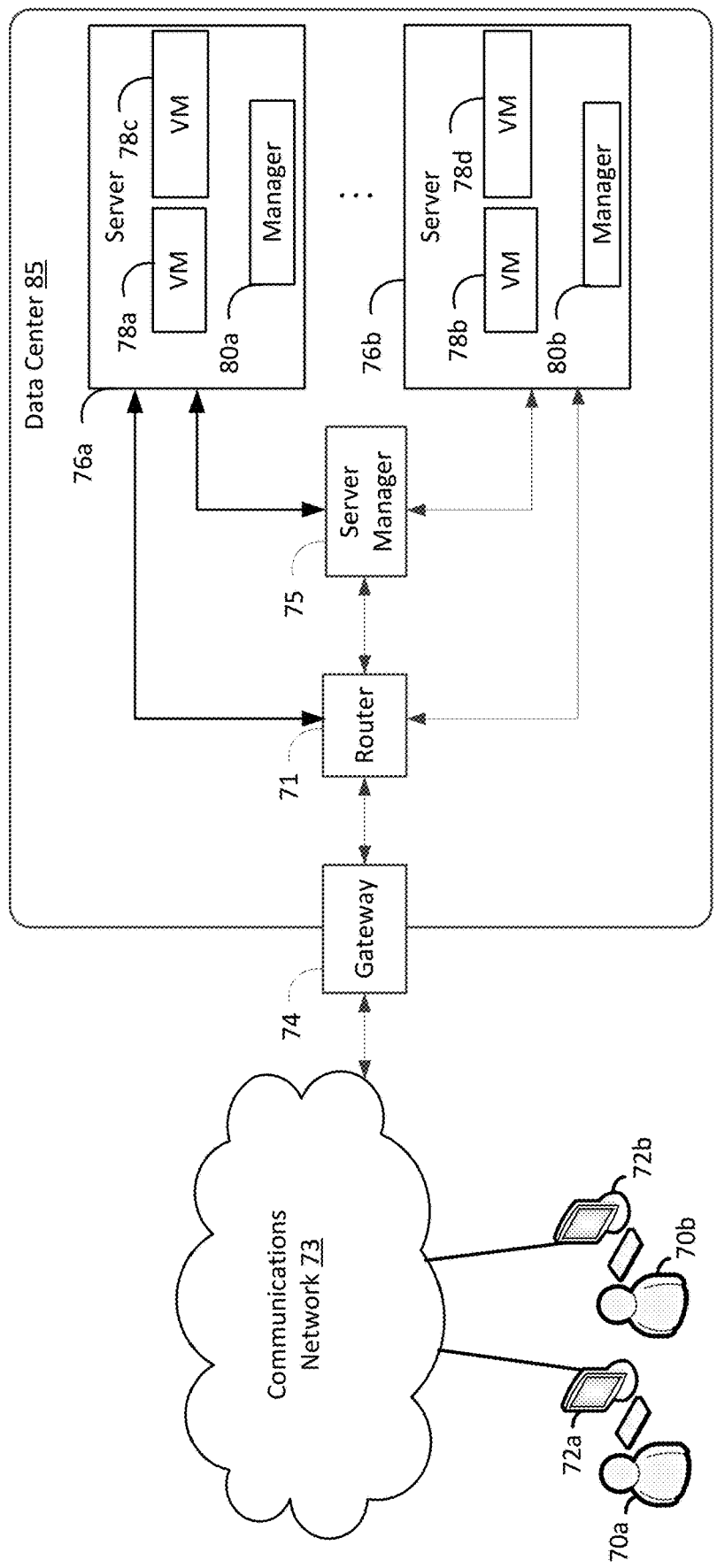
FIG. 7 is a diagram illustrating an example system for transmitting and providing data that may be used in accordance with the present disclosure.

An example system for transmitting and providing data will now be described in detail. In particular, FIG. 7 illustrates an example computing environment in which the embodiments described herein may be implemented. FIG. 7 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 7, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 7 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 7, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 7, a server manager 75 is also employed to at least in part direct various communications to, from and/or between servers 76a and 76b. While FIG. 7 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 85 described in FIG. 7 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 8:
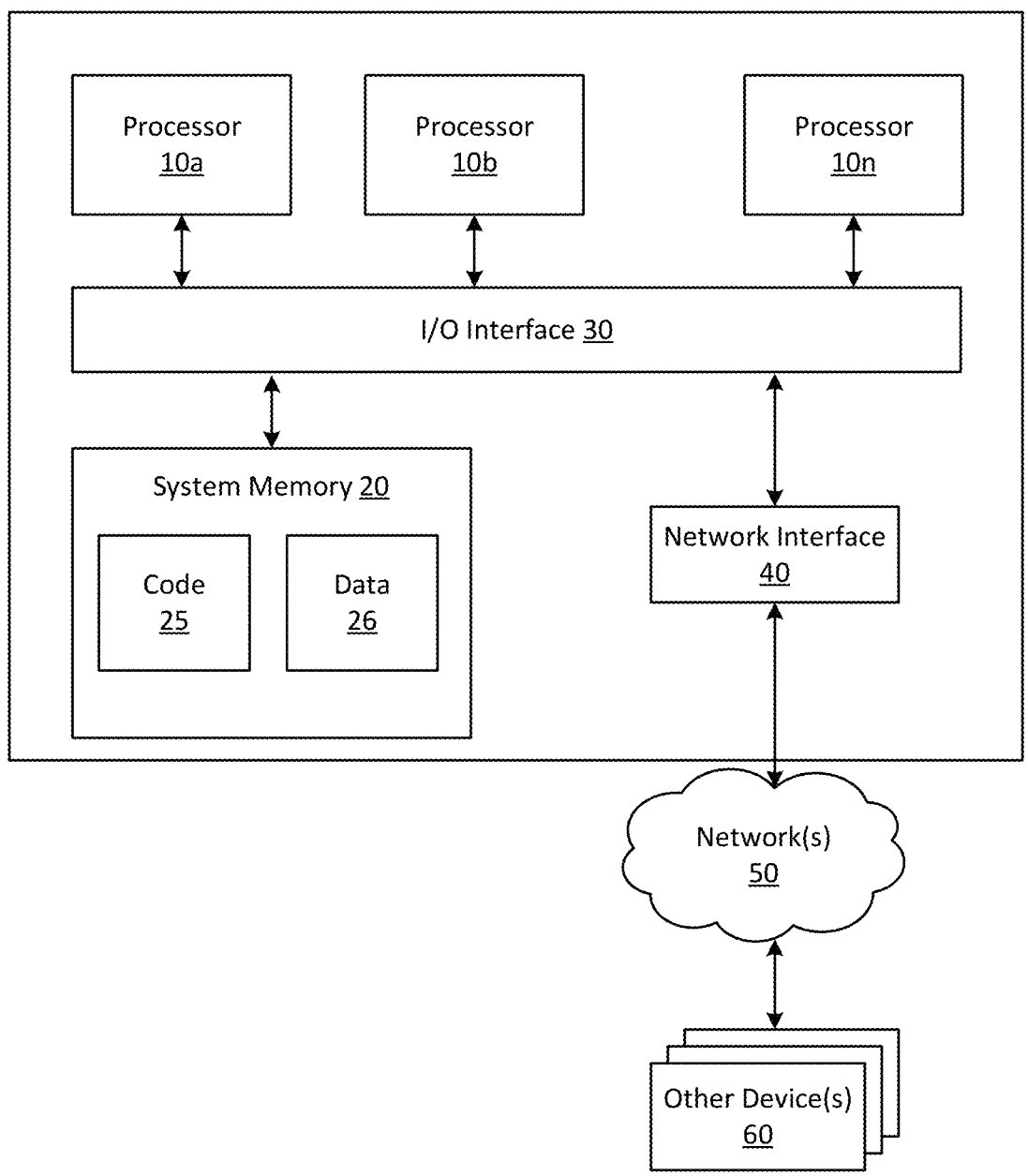
FIG. 8 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 8 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/ cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein computing instructions that, upon execution by the one or more processors, cause the computing system to perform operations comprising:
providing, by a service, one or more first interfaces indicating a plurality of times at which a plurality of publicized players are scheduled to play in a plurality of video games for which a plurality of player slots are acquired based on satisfaction of at least one acquisition criterion, wherein player access to the plurality of video games is limited to the plurality of publicized players and a plurality of users that acquire the plurality of player slots, wherein a first publicized player of the plurality of publicized players is scheduled to play in a first video game of the plurality of video games at a first time of the plurality of times;
receiving, by the service, via the one or more first interfaces, a request for a first user of the plurality of users to acquire a first player slot of the plurality of player slots for playing in the first video game with the first publicized player;
verifying, by the service, that the at least one acquisition criterion has been satisfied in relation to the first user;
providing, by the service, to the first publicized player, publicized player game access information that allows the first publicized player to enter the first video game;
providing, by the service, to the first user, based at least in part on the verifying, user game access information that allows the first user to enter the first video game;
receiving, by the service, from the first publicized player, authorization information that allows control of contents of a personal video streaming channel belonging to the first publicized player on a video streaming platform; and
configuring, by the service, based at least in part on the authorization information, video streaming of at least part of the first video game via the personal video streaming channel belonging to the first publicized player.

2. The computing system of claim 1, wherein the service allows the plurality of users to play with the plurality of publicized players without publicly exposing game player identifiers of the plurality of publicized players and identifiers of game servers on which the plurality of video games are played.

3. The computing system of claim 1, wherein the verifying that the at least one acquisition criterion has been satisfied in relation to the first user comprises verifying that the first user satisfies one or more behavior standards included in the at least one acquisition criterion.

4. The computing system of claim 1, wherein the operations further comprise providing, by the service, one or more second interfaces that allow the plurality of publicized players to schedule the plurality of times at which the plurality of publicized players are scheduled to play in the plurality of video games.

5. A computer-implemented method comprising:
providing one or more first interfaces indicating a plurality of times at which a plurality of publicized players are scheduled to play in a plurality of video games for which a plurality of player slots are acquired based on satisfaction of at least one acquisition criterion, wherein player access to the plurality of video games is limited to the plurality of publicized players and a plurality of users that acquire the plurality of player slots, wherein a first publicized player of the plurality of publicized players is scheduled to play in a first video game of the plurality of video games at a first time of the plurality of times;
receiving, via the one or more first interfaces, a request for a first user of the plurality of users to acquire a first player slot of the plurality of player slots for playing in the first video game with the first publicized player;
verifying that the at least one acquisition criterion has been satisfied in relation to the first user;
providing, to the first user, based at least in part on the verifying, user game access information that allows the first user to enter the first video game;
receiving, from the first publicized player, by a service that provides the one or more first interfaces, first authorization information that allows control of contents of a personal video streaming channel belonging to the first publicized player on a video streaming platform; and configuring, by the service, based at least in part on the first authorization information, video streaming of at least part of the first video game via the personal video streaming channel belonging to the first publicized player.

6. The computer-implemented method of claim 5, wherein the one or more first interfaces are provided by a service that allows the plurality of users to play with the plurality of publicized players without publicly exposing game player identifiers of the plurality of publicized players and identifiers of game servers on which the plurality of video games are played.

7. The computer-implemented method of claim 5, wherein the verifying that the at least one acquisition criterion has been satisfied in relation to the first user comprises verifying that the first user satisfies one or more behavior standards included in the at least one acquisition criterion.

8. The computer-implemented method of claim 5, further comprising:
   monitoring, while the first user plays in the first video game, activity of the first user;
   determining, based on the monitoring, that the first user has violated one or more behavior standards; and
   disconnecting the first user from the first video game based on violation of the one or more behavior standards.

9. The computer-implemented method of claim 5, the first player slot allows the first user to play in only part of the first video game that corresponds to a selected time duration.

10. The computer-implemented method of claim 5, wherein the user game access information is usable only a single time to enter the first video game.

11. The computer-implemented method of claim 5, further comprising providing one or more second interfaces that allow the plurality of publicized players to schedule the plurality of times at which the plurality of publicized players are scheduled to play in the plurality of video games.

12. The computer-implemented method of claim 5, further comprising providing, to the first publicized player, publicized player game access information that allows the first publicized player to enter the first video game.

13. One or more non-transitory computer-readable storage media having stored thereon computing instructions that, upon execution by one or more computing devices, cause the one or more computing devices to perform operations comprising:
   providing one or more first interfaces indicating a plurality of times at which a plurality of publicized players are scheduled to play in a plurality of video games for which a plurality of player slots are acquired based on satisfaction of at least one acquisition criterion, wherein player access to the plurality of video games is limited to the plurality of publicized players and a plurality of users that acquire the plurality of player slots, wherein a first publicized player of the plurality of publicized players is scheduled to play in a first video game of the plurality of video games at a first time of the plurality of times;
   receiving, via the one or more first interfaces, a request for a first user of the plurality of users to acquire a first player slot of the plurality of player slots for playing in the first video game with the first publicized player;
   verifying that the at least one acquisition criterion has been satisfied in relation to the first user;
   providing, to the first user, based at least in part on the verifying, user game access information that allows the first user to enter the first video game;
   receiving, from the first publicized player, by a service that provides the one or more first interfaces, authorization information that allows control of contents of a personal video streaming channel belonging to the first publicized player on a video streaming platform; and
   configuring, by the service, based at least in part on the authorization information, video streaming of at least part of the first video game via the personal video streaming channel belonging to the first publicized player.

14. The one or more non-transitory computer-readable storage media of claim 13, wherein the verifying that the at least one acquisition criterion has been satisfied in relation to the first user comprises verifying that the first user satisfies one or more behavior standards included in the at least one acquisition criterion.

15. The one or more non-transitory computer-readable storage media of claim 13, wherein the operations further comprise:
   monitoring, while the first user plays in the first video game, activity of the first user;
   determining, based on the monitoring, that the first user has violated one or more behavior standards; and
   disconnecting the first user from the first video game based on violation of the one or more behavior standards.

16. The one or more non-transitory computer-readable storage media of claim 13, wherein the operations further comprise providing one or more second interfaces that allow the plurality of publicized players to schedule the plurality of times at which the plurality of publicized players are scheduled to play in the plurality of video games.

17. The one or more non-transitory computer-readable storage media of claim 13, wherein the operations further comprise providing, to the first publicized player, publicized player game access information that allows the first publicized player to enter the first video game.

* * * * *